March 8, 1960 H. P. RANDALL Re. 24,793

LOCK NUT WITH THREAD GRIPPING FINS

Original Filed Nov. 20, 1952

INVENTOR.
H. PAGE RANDALL
BY
Francis D. Ammen
ATTORNEY

United States Patent Office

Re. 24,793
Reissued Mar. 8, 1960

24,793

LOCK NUT WITH THREAD GRIPPING FINS

Herman Page Randall, Pasadena, Calif., assignor of one-fourth each to Dr. Thomas J. Wright, Pasadena, Earl D. Siddall, Los Angeles, and Warren Howell, Altadena, Calif.

Original No. 2,758,627, dated August 14, 1956, Serial No. 321,541, November 20, 1952. Application for reissue April 1, 1957, Serial No. 650,058

11 Claims. (Cl. 151—21)

Matter enclosed in heavy brackets [ ] appears in the original patent but forms no part of this reissue specification; matter printed in italics indicates the additions made by reissue.

This invention relates to a type of check-nut which is used largely in airplane fabrication and construction. They must be light in weight and constructed of high-grade material in order to give them requisite strength in shear along the bolt.

One of the objects of the invention is to produce a nut having qualities of a check-nut, of light weight, and at the same time having ample resistance to shear along the thread of its bolt.

In order to increase the efficiency of the nut as a check-nut, and enable it to resist rotation in a reverse direction after the nut has been screwed up tight upon its seat, the end portion of the nut remote from the seat is provided with a plurality of inclined fins or tongues that engage the threads of the bolt; and one of the objects of the invent is to provide a construction for the body of the nut and its base portion that will co-operate to develop longitudinal stresses in the fins or tongues when the nut is tightened up, at the same time maintaining a firm support for the roots of the fins or tongues, that will prevent their yielding outwardly when this stress is developed.

Another object of this invention is to provide a nut of shell-type having a base portion capable of developing thrust forces in the side walls of the nut, which in turn are imparted to the inclined fins or tongues to increase the force with which their tips engage the bolt thread; and to provide such a nut with means for giving the nut the shear strength developed by the use of the sleeve referred to above, so that in one embodiment of the invention the threaded sleeve can be dispensed with, and the thread shearing strength furnished by an insert or filler carried in the chamber within the nut.

Another object of the invention is to produce a nut-blank having a form specially adapting it to be readily threaded to produce a nut having the characteristics described above.

Another object of the invention is to provide a sheet-form blank which can readily be transformed by dies to produce the nut blank referred to above.

Further objects of the invention will be evident from a careful reading of the specification and a study of the accompanying drawing.

Figure 1:
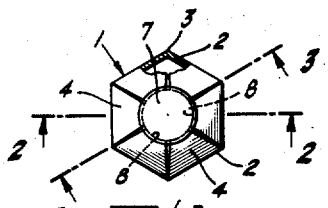
Figure 1 is a plan of a hexagonal nut embodying my invention. A portion of the nut is broken away to show the integral character of the walls of the nut.
Figure 2:
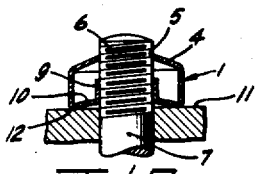
Figure 2 is a vertical section through the nut as illustrated in Figure 1, showing a portion of the bolt broken away, and also showing in section a part against which the nut seats.

Referring particularly to the parts, and especially to the embodiment illustrated in Figure 2, the nut has a body 1 of polygonal form, for example, a hexagon, such as illustrated in plan in Figure 1.

In accordance with my invention the peripheral wall of the nut has a series of side walls with dihedral angles at their adjacent edges; and the material composing the side edges of each side wall is integrally united across each dihedral angle to the material in the edge of its adjacent side.

A nut having these characteristics can be formed in different ways. It is preferably made by drawing the body of the nut from a single blank of sheet material by subjecting it to a series of operations by means of dies and forming tools.

The series of walls 2, or flat faces, of this nut at the corners 3 are integral with each other (see Figure 1), this forms a continuous unbroken hexagonal peripheral wall, and this braces all of the walls and gives them considerable rigidity for a purpose that will presently appear. These flat faces form a hexagon, and the faces can be grasped by a wrench.

A plurality of fins 4 are integral with the upper edge of the peripheral wall. These fins, one of which is attached to the edge of each flat face of the wall, are inclined away from the disc portion and inwardly toward a bolt, such as bolt 7, to which bolt the nut is to be applied. The tips of the fins form an opening therebetween of a diameter less than the diameter of the bolt so as to engage the thread 6 of the bolt 7 to which the nut is applied. Although the edges 8 of the tips 5 are of arcuate form, as indicated in Figure 1, and are preferably threaded at the same pitch and number of threads per inch as the bolt, the shear strength of a nut of this type is developed by a sleeve 9 which is integral with the disc-form base portion or base 10 of the nut. The continuous unbroken hexagonal peripheral wall comprising the walls 2 is connected to and integral with and surrounds the disc portion, or base portion 10 of the nut body.

The bore of the sleeve 9 is threaded, of course, with the same pitch and number of threads per inch as the bolt to which the nut is to be applied.

In order to develop the characteristics of a check-nut the base portion 10 of the nut is of dished form, that is, it is of concavo-convex form with its concave side or face disposed downward. The concavo-convex nature of the central disc portions 10 and 13 will be appreciated from an examination of Figs. 2 and 3, respectively. The disc portion has a concavo-convex cross-section with respect to a radial plane which passes through the axis of the nut, for example, the radial plane indicated by line 2—2 of Fig. 1. *It will be readily recognized that this dished form is one which makes the circular zone 12 (herein called contact section 12) the lower-most part of the nut so that the base portion is relieved at the center, and the sleeve at the center of its lower end is axially spaced from and above the contact section 12. Preferably the whole sleeve is axially spaced from and above the contact section 12 as shown in the figures.* The result of this is that when the nut is tightened up against a surface 11 that operates as a seat for the nut, considerable pressure is developed in a circular zone 12 where the base portion contacts the seat surface or seat 11.

Furthermore, as the nut is tightened up, the sleeve 9 moves relatively downward with respect to the zone 12 at the margin of the base 10; and this, of course, develops upward stresses in all of the side walls 2 of the nut body.

The result of this upward stress in the walls 2 is to develop increased thrust forces in the fins 4. Specifically, this is because the walls 2 at their upper edges move relatively up with respect to threaded sleeve and none of the walls can move outwardly because they are all bound to each other at their edges or corners 3.

The threads cut into the bore of the sleeve 9 have considerable shear strength, due to the fine grade of sheet material. This strength will be ample without necessitating great length in the sleeve.

Figure 3:
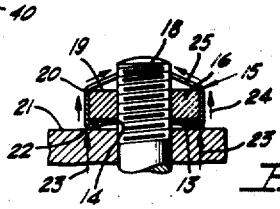
Figure 3 is a vertical section taken in the plane of the line 3—3 of Figure 1, but illustrating a different embodiment of the invention, in which the threaded sleeve referred to above is omitted, and an insert substituted that carries thread to give the necessary strength along its thread.
Figure 4:
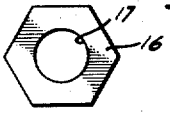
Figure 4 is a plan of the insert carried by the nut illustrated in Figure 3.

However, if the situation in which the nut is to be used necessitates increasing the shear strength of the nut adjacent the threads of the bolt, then the features of construction illustrated in Figure 3 can be adopted, in accordance with my invention. In this embodiment the sleeve 9 is omitted and the base 13 of the nut-body is provided with an opening 14 which need not be threaded and is sufficiently large in diameter to slide freely over the bolt without rotation. The base portion 13 has substantially the same dish form as the base portion 10 shown in Figure 2.

The interior of the nut body 15 in this case is provided with a filler or insert 16 having a threaded bore 17 to fit the thread 18 of its bolt, and the bottom of this filler 16 rests on the crown of the base 13 with the upper face 19 of the insert located substantially at the level of the roots 20 of the fins at their [function] *junction* with the side walls.

The insert nut or part 16, of course, is made so as to conform to the interior horizontal cross-section of the nut body. In this case also, when the nut is tightened up against the surface 21, operating as a seat for the nut, the reaction of the seat 21 will occur in the circular zone as indicated at the point 22, where the base portion joins the side walls. This develops an upward thrust indicated by the arrows 23, and this in turn develops an upward thrust in the side walls of the nut body as indicated by the arrows 24.

This thrust force in the fins, of course, greatly increases the resistance that will be developed by the nut against any force tending to rotate it in a reverse direction, that is, in a direction to loosen the nut. So, a nut having these characteristics will not become loose by vibration.

It will be evident that the nut-body 1 shown in Figure 2 and the nut-body shown in Figure 3 are substantially identical in form except that in the form shown in Figure 3 the sleeve 9 of Figure 2 is omitted.

In completing the nut shown in Figure 3, it is necessary to put the insert 16 in place before the fins 25 are bent over to their inclined positions in which they are shown in Figure 3. The insert 16, of course, would be in the form of a blank when inserted in the shell of the nut, and after bending the fins 25 over to their proper inclination, a tap would be run through the insert, and the space between the tips of the fins to cut the thread for the bolt 18. Tapping in this way would form threads in the same phase in the insert and in the tips of the fins, insuring that the fins would run properly in the thread of the bolt when the nut is applied to it.

In both illustrated embodiments of the invention, the nut is shown having an even number of sides. This is desirable because the forces exerted by the fins are diametrically opposite from each other. However, balanced forces will also be obtained by symmetrically disposed sides. For example, the drawings show a regular polygon with equal sides and equal dihedral angles. A regular polygon having four or more sides (whereby the fins are symmetrically spaced) provides force vectors which cancel each other out so that there is no unbalanced side load in any direction on the screw or bolt on account of the nut.

Figure 6:
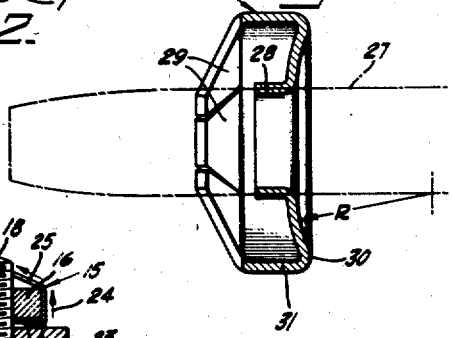
Figure 6 is a longitudinal section through a nut-blank and indicating how it is threaded by a tap.

In Figure 6 I illustrate a nut-blank 26 such as would be employed for making the nut illustrated in Figure 2. In that case also a tap such as indicated by the dotted lines 27 would be run through the opening in the sleeve 28 of the nut blank, and after cutting the thread there, would move into contact with the tips of the fins 29 and cut the thread in them. In Figure 6 the radius R is indicated on which the concave face of this blank is struck. The arcuate line struck by the radius preferably reaches tangency with the fillet or fillister 30, the other side of which is tangent to the other face 31 of the side walls of the nut-body at about their middle point, although this detail is relatively unimportant so long as [a pronounced] *the* dish or depression *that* occurs on the face of the nut that seats against the surface 21 or 11 *is pronounced, so as to provide a substantial relief. That is to say, the base portion 10 has a relieved section at the central part of its lower surface adjacent the sleeve. The base portion has its contact section at the numeral 12 in Fig. 2. The relieved section spaces the base of the sleeve axially from the contact section. It will be noted that the threads in the sleeve are thereby elevated above the contact section.*

Figure 5:
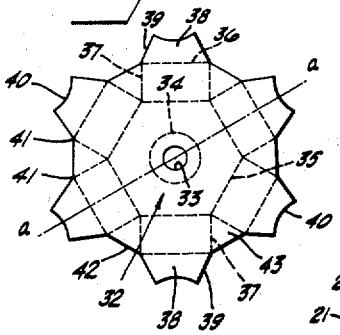
Figure 5 is a plan of the blank of sheet material having features of form that adapt it to be readily transformed by forming dies into the nut-blank shown in Figure 6.

The nut-blank shown in Figure 6 is preferably formed up from a plate-form blank 32 having the features of construction illustrated in Figure 5. This blank, when employed to form the nut-blank that has the sleeve 9, has a relatively small central opening 33 the material immediately surrounding which is formed by the dies into the extrusion or sleeve 9. When the plate blank 32 is employed to produce the nut-blank from which the nut illustrated in Figure 3 is made, the blank 32 will have a relatively larger opening at its center such as indicated by the dotted circle 34.

The material of this blank 32 may be considered as composed of a hexagonal central portion having the perimeter 35 indicated by a dotted line in Figure 5. The six sides of this perimeter may be considered as composed of rectangular areas bounded on three sides by (a) the boundary lines 36 that are parallel with the sides of the hexagon center, and (b) the end lines for these rectangles indicated by the dotted lines 37. These rectangles, of course, become bent up on the side lines of the "hex" center to form the side walls 2 of the nut.

Beyond the boundary lines 36, outwardly projecting tongues 38 are located, having converging side edges 39 so that these tongues have considerable taper. The tips of these tongues have concave edges 40 formed with the concave side outermost. These arcs 40 would be at a radius that facilitates cutting the threads at the tips, that is to say, they cause the tongues at their tips to conform substantially to the arc of curvature of the side of the bolt, and leave sufficient material to cut the full depth of thread with the tap.

Between the points 41, 41 on the blank, at the roots of the tongues or fins 38 a considerable space or gap is present and between these points boundary lines 42 complete the blank; that is they complete its outline. In this way small triangular areas are formed between the lines 42 and the end lines 37 of the rectangles that form the side walls of the nut-bodies. This materdial in the triangular areas 43 is worked by the dies into the end portions of the walls of the nut blanks and result in a slight increase in the thickness of material at the junction points 3 where the ends of the side walls 2 of the nut are integrally united.

A distinguishing feature of the nut described above is that the fins 4 are spaced from each other so that the thrust force imparted at their outer ends to the side walls 2 that carry them is balanced. That is to say, the reactive thrust forces developed at the roots of the fins by the reaction of the bolt against their tips do not tend to distort the polygonal solid peripheral wall of the nut from its proper form. In other words, due to the action of these forces there is no more tendency to stretch the periphery in any one direction more than in any other direction. This is not true in a nut that employs only two diametrically opposite fins because the forces in them are directed along the same line, and there is no force acting outwardly on the two intermediate inclined side walls to hold them in place.

In the nut described herein, the outward thrust forces in all the fins co-operate to maintain all the dihedral angles between the walls at 120 degrees. And hence every side wall is braced against moving outwardly by the two inclined walls between which it is located.

Many other embodiments of the invention may be resorted to without departing from the spirit of the invention.

I claim as my invention and desire to secure by Letters Patent:

1. A hexagonal nut comprising a central disc portion of concavo-convex cross section with respect to a radial plane passing through the axis of the nut, said nut having a continuous unbroken hexagonal peripheral wall with flat faces forming the hexagon, which wall is connected to and surrounds said disc portion, said disc portion having a central threaded sleeve to receive a bolt extending upwardly therefrom, the upper edge of the peripheral wall having a plurality of fins integral therewith and inclined away from the disc portion toward the bolt for engagement therewith, each of the flat faces of the wall constituting the hexagon carrying one of said fins, the free ends of said fins forming an opening therebetween of a diameter smaller than the diameter of the bolt, and the disc portion having its concave side facing toward the lower edge of said peripheral wall.

2. A polygonal nut comprising a central disc portion of concavo-convex cross-section with respect to a radial plane passing through the axis of the nut, said nut having a continuous unbroken peripheral wall with flat faces forming an even-number sided polygon having at least four sides, which wall is connected to and surrounds said disc portion, said disc portion having a central threaded sleeve to receive a bolt extending upwardly therefrom, the upper edge of the peripheral wall having a plurality of fins integral therewith and inclined away from the disc portion toward the bolt for engagement therewith, each of the flat faces of the wall constituting the polygon carrying one of said fins, the free ends of said fins forming an opening therebetween of a diameter smaller than the diameter of the bolt, and the disc portion having its concave side facing toward the lower edge of said peripheral wall.

3. A polygonal nut comprising a central disc portion of concavo-convex cross-section with respect to a radial plane passing through the axis of the nut, said nut having a continuous unbroken regular polygonal peripheral wall with at least four sides with flat faces forming the regular polygon which wall is connected to and surrounds said disc portion, said disc portion having a central threaded sleeve to receive a bolt extending upwardly therefrom, the upper edge of the peripheral wall having a plurality of fins integral therewith and inclined away from the disc portion toward the bolt for engagement therewith, each of the flat faces of the wall constituting the regular polygon carrying one of said fins, the free ends of said fins forming an opening therebetween of a diameter smaller than the diameter of the bolt, and the disc portion having its concave side facing toward the lower edge of said peripheral wall.

*4. A polygonal nut for engagement to a threaded bolt, said nut having a longitudinal axis, and comprising a base portion transverse to and having a hole therethrough on said axis, a contact section and a relieved section on the said base portion, a sleeve having an internally threaded axial hole therethrough integral with said base portion at the hole thereof, said sleeve being adapted to threadedly engage said bolt, the contact section and the end of the sleeve adjacent the base portion being axially spaced from each other and on axially opposite sides of the said relieved section whereby the contact section is the bottom-most part of the nut, a continuous unbroken regular polygonal wall with at least four sides with flat faces forming the regular polygon, which wall is connected to and surrounds said base portion, the upper edge of the peripheral wall having a plurality of fins integral therewith and inclined away from the base portion and toward the said axis, each of the flat faces of the wall constituting the regular polygon carrying one of said fins, the free ends of said fins forming an opening therebetween of a diameter no larger than the diameter of the bolt, said opening being axially spaced from the sleeve.*

*5. A hexagonal nut comprising a central base portion having a contact section which is the bottom-most part of the nut, a continuous unbroken hexagonal peripheral wall with flat faces forming the hexagon, which wall is connected to and surrounds said central base portion, said central base portion having a central threaded sleeve to threadedly engage a bolt extending upwardly therefrom, the upper edge of the peripheral wall having a plurality of fins integral therewith and inclined away from the central base toward the bolt for engagement therewith, each of the flat faces of the wall constituting the hexagon carrying one of said fins, said central base portion having its bottom relieved adjacent the central sleeve, whereby the bottom of the sleeve is axially spaced from the bottom of the nut, the free ends of said fins forming an opening therebetween of a diameter no greater than the diameter of the bolt, said opening being axially spaced from the sleeve.*

*6. A polygonal nut for engagement to a threaded bolt, said nut having a longitudinal axis, and comprising a base portion transverse to and having a hole therethrough on said axis, a contact section and a relieved section on the said base portion, a sleeve having an internally threaded axial hole therethrough integral with said base portion at the hole thereof, said sleeve being adapted to threadedly engage said bolt, the contact section being the bottom-most part of the nut, a continuous unbroken regular polygonal wall with at least four sides with flat faces forming the regular polygon, which wall is connected to and surrounds said base portion, the upper edge of the peripheral wall having a plurality of fins integral therewith and inclined away from the base portion and toward the said axis, each of the flat faces of the wall constituting the regular polygon carrying one of said fins, the free ends of said fins forming an opening therebetween of a diameter no larger than the diameter of the bolt, said opening being axially spaced from the sleeve.*

*7. A nut according to claim 6 in which the said wall is a regular hexagon.*

*8. A nut according to claim 6 in which the threads in the sleeve are all axially spaced from the contact section.*

*9. A hexagonal nut comprising a central disc portion of concavo-convex cross section with respect to a radial plane passing through the axis of the nut, said nut having a continuous unbroken hexagonal peripheral wall with flat faces forming the hexagon, which wall is connected to and surrounds said disc portion, said disc portion having a central threaded sleeve to receive a bolt extending upwardly therefrom, the upper edge of the peripheral wall having a plurality of fins integral therewith and inclined away from the disc portion and toward the bolt for engagement therewith, each of the flat faces of the wall constituting the hexagon carrying one of said fins, the free ends of said fins forming an opening therebetween of a diameter no larger than the diameter of the bolt, said opening being axially spaced from the sleeve, and the disc portion having its concave side facing towarding the lower edge of said peripheral wall.*

*10. A polygonal nut comprising a central disc portion of concavo-convex cross-section with respect to a radial plane passing through the axis of the nut, said nut having a continuous unbroken peripheral wall with flat faces forming an even-number sided polygon having at least four sides, which wall is connected to and surrounds said disc portion, said disc portion having a central threaded sleeve to receive a bolt extending upwardly therefrom, the upper edge of the peripheral wall having a plurality of fins integral therewith and inclined away from the disc portion and toward the bolt for engagement therewith, each of the flat faces of the wall constituting the polygon carrying one of said fins, the free ends of said fins forming an opening therebetween of a diameter no larger than the diameter of the bolt, said opening being axially spaced from the sleeve, and the disc portion having its concave side facing toward the lower edge of said peripheral wall.*

*11. A polygonal nut comprising a central disc portion of concavo-convex cross-section with respect to a radial plane passing through the axis of the nut, said nut having a continuous unbroken regular polygonal peripheral wall with at least four sides with flat faces forming the regular polygon which wall is connected to and surrounds said disc portion, said disc portion having a central threaded sleeve to receive a bolt extending upwardly therefrom, the upper edge of the peripheral wall having a plurality of fins integral therewith and inclined away from the disc portion toward the bolt for engagement therewith, each of the flat faces of the wall constituting the regular polygon carrying one of said fins, the free ends of said fins forming an opening therebetween of a diameter no larger than the diameter of the bolt, said opening being axially spaced from the sleeve, and the disc portion having its concave side facing toward the lower edge of said peripheral wall.*

References Cited in the file of this patent
or the original patent

UNITED STATES PATENTS

| | | |
|---|---|---|
| 1,990,718 | Swanstrom | Feb. 12, 1935 |
| 2,394,491 | Schaper | Feb. 5, 1946 |
| 2,410,995 | Olson | Nov. 12, 1946 |
| 2,494,882 | Kost | Jan. 17, 1950 |
| 2,633,886 | Tinnerman | Apr. 7, 1953 |
| 2,777,495 | Pavlinetz | Jan. 15, 1957 |

FOREIGN PATENTS

| | | |
|---|---|---|
| 903,928 | France | Feb. 12, 1945 |
| 67,108 | Netherlands | Jan. 15, 1951 |